United States Patent [19]

Itoh et al.

[11] 4,422,024
[45] Dec. 20, 1983

[54] WIPER CONTROL DEVICE FOR VEHICLE

[75] Inventors: Hajime Itoh, Aichi; Yoshiyuki Igarashi, Nagoya, both of Japan

[73] Assignee: Toyota Jidosha Kogyo Kabushiki Kaisha, Toyota, Japan

[21] Appl. No.: 337,715

[22] Filed: Jan. 7, 1982

[30] Foreign Application Priority Data

Sep. 3, 1981 [JP] Japan ................................. 56-139198

[51] Int. Cl.³ .............................................. H02P 3/10
[52] U.S. Cl. ............................. 318/443; 318/DIG. 2; 318/466; 318/468
[58] Field of Search ............... 318/443, 444, 445, 466, 318/468, DIG. 2

[56] References Cited

U.S. PATENT DOCUMENTS 4,329,631 5/1982 Betch et al. .......................... 318/466

Primary Examiner—J. V. Truhe
Assistant Examiner—Arthur G. Evans
Attorney, Agent, or Firm—Cushman, Darby & Cushman

[57] ABSTRACT

A wiper control device for a vehicle capable of accurately stopping wiper blades always at the lowermost position of a wiping range regardless of the rotating speed of a wiper motor. The wiper control device automatically stops the wiper motor at the lowermost position of the wiper blades with a control circuit which obtains a sliding angle corresponding to the rotating speed of the wiper motor from the rotating speed of the motor and controls to flow an electric current continuously in the motor during the time while the motor reaches a rotating position even after the motor is interrupted by selecting the cam contact position with respect to the annular electrode. Thus, this wiper control device can eliminate to disturb the visual field of a driver with the wiper blades.

3 Claims, 5 Drawing Figures

WIPER CONTROL DEVICE FOR VEHICLE

BACKGROUND OF THE INVENTION

This invention relates to a wiper control device for a vehicle and, more particularly, to improvements in a wiper control device capable of accurately stopping wiper blades always at the lowermost position of a wiping range regardless of the rotating speed of a wiper motor.

A wiper control device for a conventional vehicle controls, as shown in FIGS. 1 and 2, the rotation of and the stopping position of a wiper motor 3 by journaling a cam plate 2 formed with an annular electrode 1 of a predetermined pattern making slidable contact with cam contacts a, b and c integrally at a motor shaft 4 of the wiper motor 3 and selectively isolating or contacting the cam contacts a, b and c from or with the electrode 1 in accordance with the rotating position of the cam plate 2. That is, when the wiper is stopped, the cam contacts a and b make contact with the projection 5 of the electrode 1 of the cam plate 2 as shown. When a wiper switch 7 is turned ON from the above state in the state that an ignition switch 6 is turned ON, an electric current will flow through the wiper motor 3 in a circuit of a battery 8, the ignition switch 6, the ON terminal of the wiper switch 7 and the motor 3, thereby rotating the wiper blades to wipe a window glass surface. If the wiper switch 7 is turned OFF in the course of wiping the window glass, since the cam contacts a and c make contact and thus shortcircuits in the course of wiping the window glass, the current continues to flow thrugh the wiper motor 3 in a circuit of the battery 8, the ignition switch 6, the cam contact c, the cam contact a, the OFF terminal of the wiper switch 7 and the wiper motor 3 irrespective of the OFF state of the wiper switch 7. When the wiper blades then reach the lower end position of the wiping range, the cutout 9 of the annular electrode 1 arrives at the lower part of the cam contact c, the shortcircuit between the cam contacts a and c is thus opened, and the current of the wiper motor 3 is interrupted in this manner. However, the wiper motor 3 continuously rotates due to the inertia of rotation. When the projection 5 of the electrode 1 thus makes contact with the cam contacts a and b, the wiper motor 3 is shortcircuited in a closed loop formed by a circuit of the wiper motor 3, the OFF terminal of the wiper switch 7, the cam contact a, the cam contact b, and the wiper motor 3, and an electromagnetic brake action occurs to stop the wiper motor.

Since the wiper motor 3 will however stop in the conventional wiper control device after it rotates at a certain sliding angle due to the inertia of rotation as evident from the above described operation, the wiper motor 3 will irregularly stop at the position in accordance with the magnitude of the inertia and hence the magnitude of the actual rotating speed of the wiper motor 3, and it is accordingly impossible to always stop accurately at the correct middle line X—X position corresponding to the lowermost position of the wiping range in FIG. 2. Thus, if the wiper motor 3 does not stop at the correct middle line X—X position, the wiper blades on the window glass surface will stop above the position from the lowermost position of the wiping range. The wiper blades thus stopped disturb the visual field of a driver and accordingly cause difficulty in the safety of the vehicle.

SUMMARY OF THE INVENTION

It is, accordingly, a primary object of this invention to provide an improved wiper control device for a vehicle in which all the aforementioned disadvantages and drawbacks of the conventional wiper control device can be eliminated and which can stop wiper blades always accurately at the lowermost position of their wiping range via a wiper motor even if an irregularity occurs in the sliding angle of the wiper motor at the time of stopping the wiper blades due to the variation in the rotating speed of the wiper motor.

Another object of this invention is to provide a wiper control device for a vehicle in which the current interrupting timing of a wiper motor is automatically controlled by obtaining the sliding angle of the wiper motor corresponding to the rotating speed of the wiper motor even if the rotating speed of the wiper motor is varied.

Still another object of this invention is to provide a wiper control device for a vehicle in which the wiper blades can be always stopped at the position on a window glass surface so as not to disturb the visual field of a driver.

BRIEF DESCRIPTION OF THE DRAWINGS

The above and other relates objects and features of the invention will be apparent from a reading of the following description of the disclosure found in the accompanying drawings and novelty thereof pointed out in the appended claims.

DESCRIPTION OF THE PREFERRED EMBODIMENTS

A principle of controlling a wiper according to the present invention will be first described for the better understanding of the construction and operation of the wiper control device according to the present invention.

Figure 1:
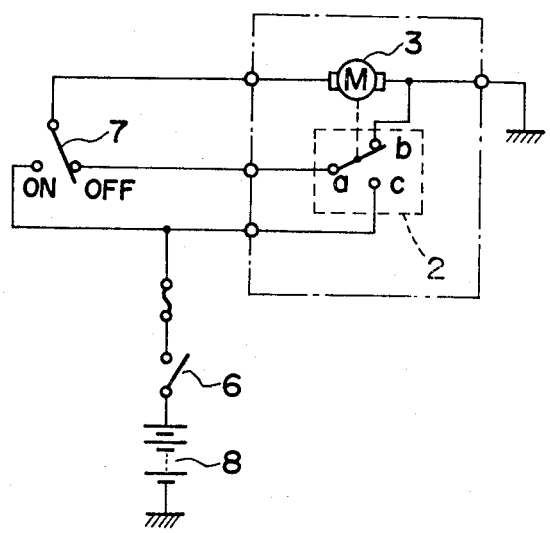
FIG. 1 is an electric circuit diagram of a wiper control device for a conventional vehicle.

Referring back to FIGS. 1 and 2, assuming that the actual number of revolutions of the wiper motor 3 is represented by $N_1$ and the time in which the cam contacts a and c on the cam plate 2 are shortcircuited with the annular electrode 1 (that is, the time required that the cam plate 2 rotates at the rotating angle of $360° - \theta_0$) is represented by $T_1$, the actual number $N_1$ of revolutions (rotating speed) of the wiper motor can be obtained from the following formula:

$$N_1 \simeq \frac{1}{T_1} \cdot \frac{360 - \theta_0}{360} \tag{1}$$

Figure 3:
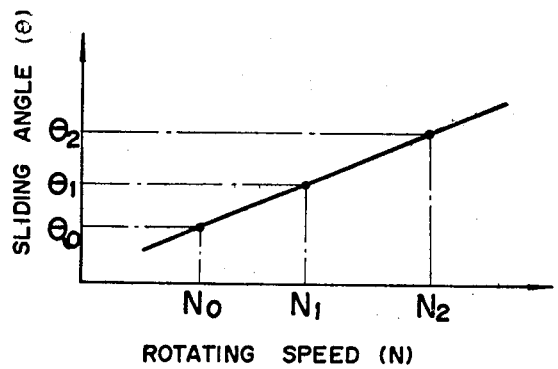
FIG. 3 is a graphical representation indicating the relationship between the number of revolution of a wiper motor and the sliding angle thereof.

Since a proportional relation exists generally between the number N of revolutions and the sliding angle $\theta$ of the wiper motor 3 as shown in FIG. 3, the sliding angle $\theta$ with respect to the number $N_1$ of revolutions can be determined. More particularly, when the actual number of revolutions of the wiper motor 3 is represented by $N_1$, the wiper motor 3 will stop after it rotates at the sliding angle $\theta_1$ from the position where an electric current is interrupted due to its inertia.

Figure 2:
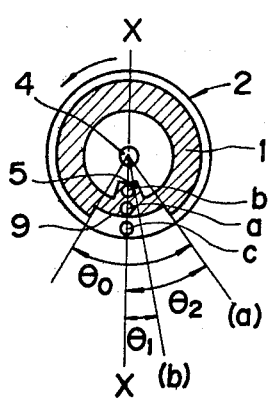
FIG. 2 is a cross sectional view of a cam plate used in the conventional wiper control device.

Accordingly, in order that the wiper motor 3 may accurately stop at the correct middle line X—X position in FIG. 2 when the wiper motor 3 is rotating at the rotating speed $N_1$, it is understood that an electric current is continuously flowed in the wiper motor 3 by certain means until the wiper motor 3 reaches the position designated by (b) in FIG. 2 even after the shortcircuit between the cam contacts a and c is interrupted at the position designated by (a) in FIG. 2 at the cutout 9 of the annular electrode 1 so that the current is interrupted, and the current thus flowed is interrupted when the wiper motor 3 arrives at the position designated by (b) in FIG. 2 under the control.

The time $T_2$ required that the wiper motor 3 having the rotating speed $N_1$ passes between the sliding angle $\theta_2 - \theta_1$ is represented by the following formula:

$$T_2 = \frac{1}{N_1} \cdot \frac{\theta_2 - \theta_1}{360} = T_1 \cdot \frac{\theta_2 - \theta_1}{360 - \theta_0} \quad (2)$$

Since there exists a relation of $\theta_1 = kN_1$, where k represents the constant of proportion, as obvious from FIG. 3, this is substituted in the above formula, and the time $T_2$ can be obtained from the following formula:

$$T_2 = \frac{\theta_2}{360 - \theta_0} \cdot T_1 - \frac{k}{360} \quad (3)$$

Consequently, when the current is flowed during the time $T_2$ obtained as above continuously under the control even after the current of the wiper motor 3 is interrupted, the wiper motor 3 can be accurately stopped always at the correct middle line X—X position even if the rotating speed of the wiper motor 3 is varied.

Figure 4:
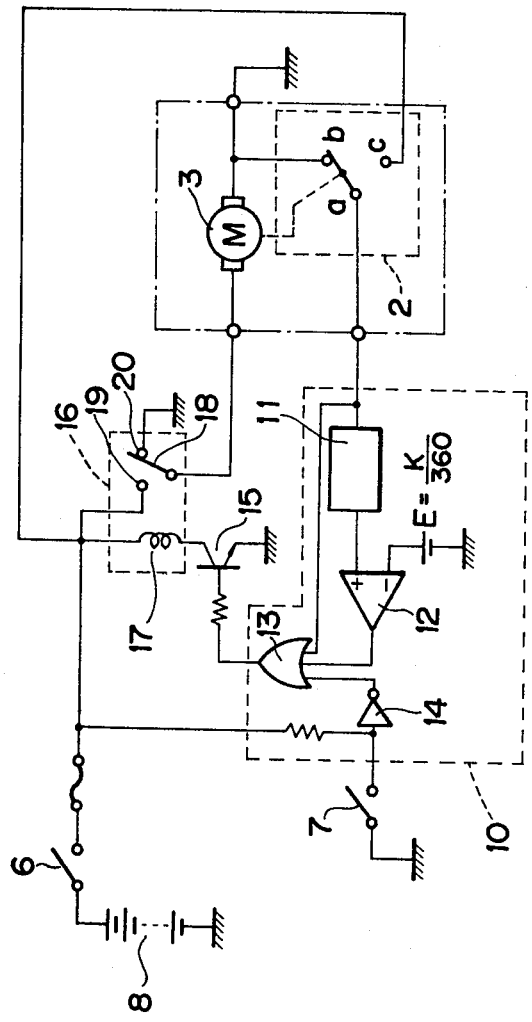
FIG. 4 is an electric circuit diagram showing one preferred embodiment of the wiper control device for a vehicle constructed according to the present invention.

Reference is now made to the drawings, and particularly to FIG. 4 which shows one preferred embodiment of the wiper control device constructed according to the controlling principle described above according to the present invention.

In FIG. 4, a control circuit 10 consists of a triangular wave generating circuit 11, a comparator 12, an OR gate 13 and an inverter 14. The control circuit 10 obtains the time $T_2$ by calculating the formula (3), energizes the relay coil 17 of a relay 16 through a transistor 15 and controls flow of electric current through the wiping motor 3 during the time duration $T_2$.

A cam plate 2 of the structure similar to that shown in FIG. 2 is journaled integrally at the shaft of the wiper motor 3. A cam contact a on the cam plate 2 is connected to the triangular wave generating circuit 11 in the control circuit 10, and a cam contact b on the cam plate 2 is connected to an earth side of the wiper motor 3.

A wiper switch is connected to the inverter 14 in the control circuit 10, produces a "0" signal to the inverter 14 when the switch is turned ON, and the inverter 14 will invert the "0" signal into "1" feed it to the OR gate 13.

The operation of the above embodiment of the present invention will be described.

When the wiper switch 7 is turned ON in the state that the ignition switch 6 is closed ON, the "1" signal is inputted from the inverter 14 to the OR gate 13 as described above, the transistor 15 is thus turned on to energize the relay coil 17 of the relay 16. Thus, the movable contact 18 of the relay 16 is shifted to the stationary contact 19 side, and an electric current will flow from the battery 8 through the switch 6, the contact 19 and the wiper motor 3. Then, the wiper motor 3 is thus rotated, and the wiper blades are rockably rotated rightwardly and leftwardly to start wiping the window galss of a vehicle.

Figure 5:
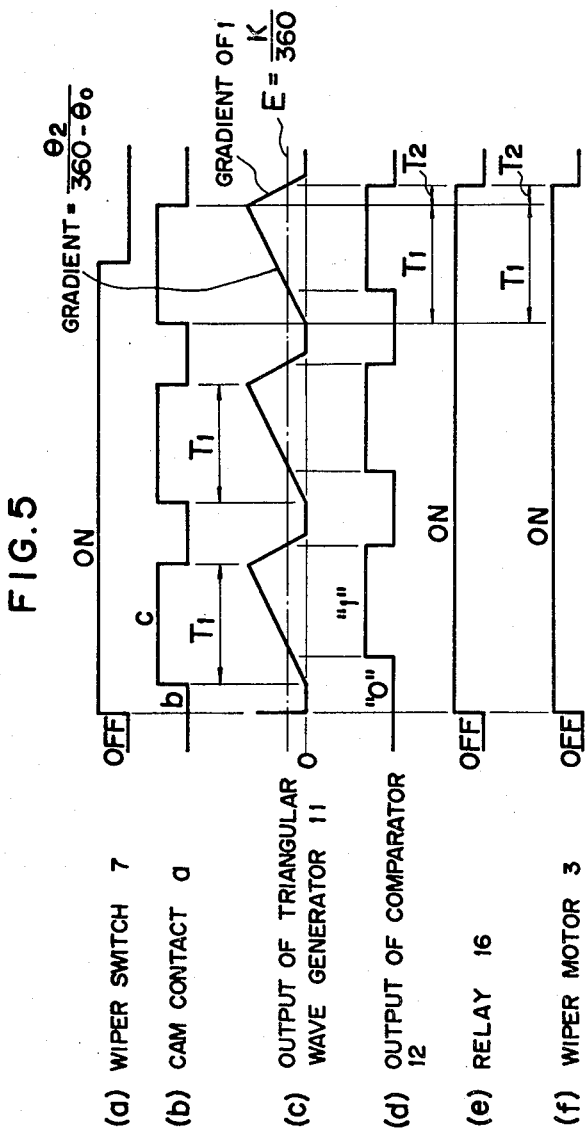
FIG. 5 is waveform timing chart of respective components in the electric circuit of the wiper control device for the explanatory purpose of the present invention.

When the wiper motor 3 is thus rotated, the cam plate 2 is synchronously rotated to the motor 3, and the cam contact a disposed on the cam plate 2 is alternately connected to the cam contacts b and c according to the rotating position as shown in FIG. 5(b).

The triangular wave generating circuit 11 in the control circuit 10 receives the signal from the cam contact a as indicated in FIG. 5(b) and rises at the output voltage with a gradient represented by $$\theta_2/(360 - \theta_1)$$

during the time $T_1$ in which the cam contact a is connected to the cam contact c as indicated in FIG. 5(c), and produces a triangular wave voltage falling at the output voltage with a gradient of 1 when the cam contact a is shifted to the cam contact b side.

The comparator 12 compares the triangular wave voltage from the triangular wave generating circuit 11 with a reference voltage represented by $$E = k/360$$

in magnitude, and produces a "1" output when the triangular wave voltage is higher than the reference voltage E and a "0" output when the triangular wave voltage is lower than the reference voltage E as indicated in FIG. 5(d). That is, the above triangular wave generating circuit 11 and the comparator 12 operate to execute the calculation of the formula (3) described above.

Accordingly, when the wiper switch 7 is opened (turned OFF) in the course of wiping by the wiper blades as indicated in FIG. 5(a), the output of the comparator 12 becomes "0" output as indicated in FIG 5(d) after the time $T_1$ elapses so that the cam contact a is shifted from the cam contacts c side to the cam contact b side with the result that the time $T_2$ elapses. Consequently, the relay 16 is continuously energized during the time $T_2$ even after the time $T_1$ elapses as indicated in FIG. 5(e). Resultantly, the wiper motor 3 is not interrupted at the position designated by (a) in FIG. 2 as in the conventional wiper control device, but is interrupted at the position designated by (b) in FIG. 2 corresponding to the time $T_2$. Thus, the wiper motor 3 is rotated to slide at the sliding angle $\theta_1$ corresponding to the rotating speed $N_1$ at that time, and then accurately stopped at the correct middle line X—X position corresponding to the lowermost position of the wiper blades.

It should be noted that the foregoing description with respect to the preferred embodiment of the wiper control device shown in FIG. 4 is directed to the construction in which the control circuit 10 consists of the triangular wave generating circuit 11 and the comparator 12, but a microcomputer may also be employed instead of the control circuit 10. In this case, the aforementioned formula (3) may be calculated directly by a CPU to obtain the time $T_2$.

It should be understood from the foregoing description that since the wiper control device thus constructed and operated according to the present invention can automatically control the current interrupting timing of the wiper motor by obtaining the sliding angle of the wiper motor corresponding to the rotating speed of the wiper motor at that time even if the rotating speed of the motor is varied, it can stop the wiper blades always accurately at the lowermost position of the wiping range so as not to disturb the visual field of the driver.

What is claimed is:

1. A wiper control device for use with a vehicle for automatically stopping a wiper motor at a lowermost position of its wiping range when a wiper switch is turned OFF at an arbitrary time, wherein said motor synchronously rotates a cam plate formed with an annular electrode of a predetermined pattern on the surface thereof and has a plurality of cam contacts selectively isolated from or contacted with said annular electrode at predetermined angular positions in accordance with the revolution of said wiper motor, said device comprising:

control circuit means for obtaining from the rotating speed of said wiper motor a sliding angle corresponding to the rotating speed of said wiper motor and causing an electric current to flow continuously in said wiper motor before and even after said wiper motor is interrupted by selectively isolating a said cam contact from said annular electrode, wherein the sliding angle of said wiper motor is obtained by $$T_2 = \frac{\theta_2}{360 - \theta_0} \cdot T_1 - \frac{k}{360}$$

wherein $T_1$ represents the time in which said cam contacts are shortcircuited with said annular electrode, $T_2$ represents the time required that said wiper motor passes the sliding angle, k is a constant of proportion, $\theta_0$ represents the rotating angle of said cam plate during the time $T_1$, and $\theta_2$ represents the arbitrary sliding angle of said wiper motor stopped from a predetermined rotating speed as required during the time $T_2$.

2. The wiper control device according to claim 1, wherein said control circuit comprises:

triangular wave generating circuit means responsive to a signal from said cam contact for producing a triangular wave voltage output rising at a gradient represented by $$\theta_2/(360 - \theta_1)$$

during the time $T_1$ and falling at a gradient of 1, where $\theta_1$ represent the sliding angle of said wiper motor from the position where said wiper motor is interrupted due to the inertia of said wiper motor; and comparator means responsive to the triangular wave voltage from said triangular wave generating circuit means for comparing the triangular wave voltage from said triangular wave generating circuit means with a reference voltage represented by $$E = k/360$$

and producing a high level output when the triangular wave voltage is higher than the reference voltage E and a low level output when the triangular wave voltage is lower than the reference voltage E.

3. A method of automatically stopping a vehicle wiper motor at the lowermost position of a wiping range, comprising the steps of:

obtaining from the rotating speed of said wiper motor a sliding angle corresponding to the rotating speed of said wiper motor;

flowing electric current continuously in said wiper motor before and after said wiper motor is interrupted in accordance with said sliding angle, wherein said sliding angle of said wiper motor is obtained by $$T_2 = \frac{\theta_2}{360 - \theta_0} \cdot T_1 - \frac{K}{360}$$

where $T_1$ represents the time in which said cam contacts are shortcircuited with said annular electrode, $T_2$ represents the time required that said wiper motor passes the sliding angle, k is a constant of proportion, $\theta_0$ represents the rotating angle of said cam plate during the time $T_1$, and $\theta_2$ represents the arbitrary sliding angle of said wiper motor stopped from a predetermined rotating speed as required during the time $T_2$.

* * * * *